Oct. 3, 1961 W. W. PAGET 3,002,560
MECHANIZED OIL FIELD DRILL RIG
Filed Jan. 13, 1955 11 Sheets-Sheet 1
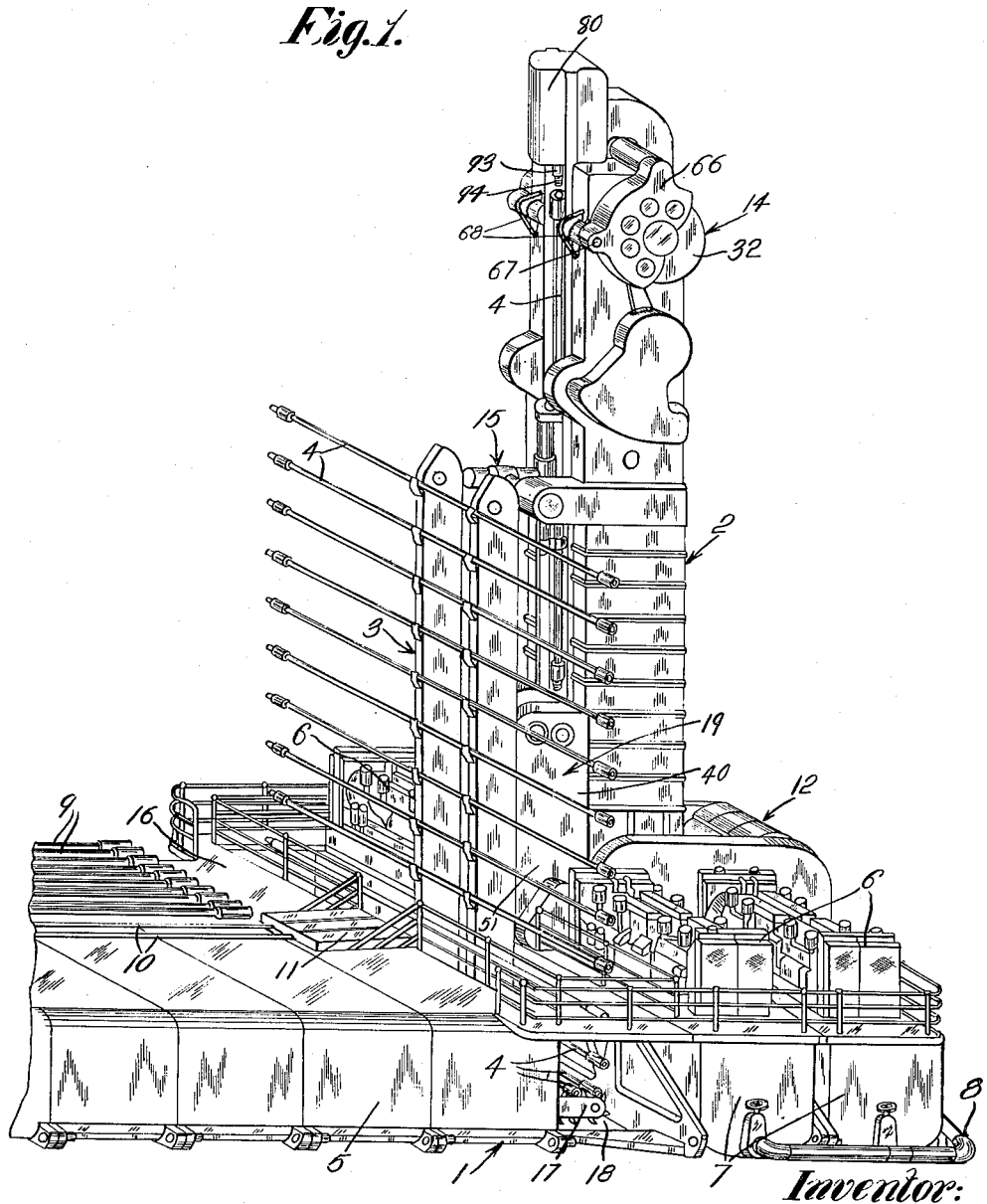

Oct. 3, 1961  W. W. PAGET  3,002,560
MECHANIZED OIL FIELD DRILL RIG
Filed Jan. 13, 1955  11 Sheets-Sheet 2
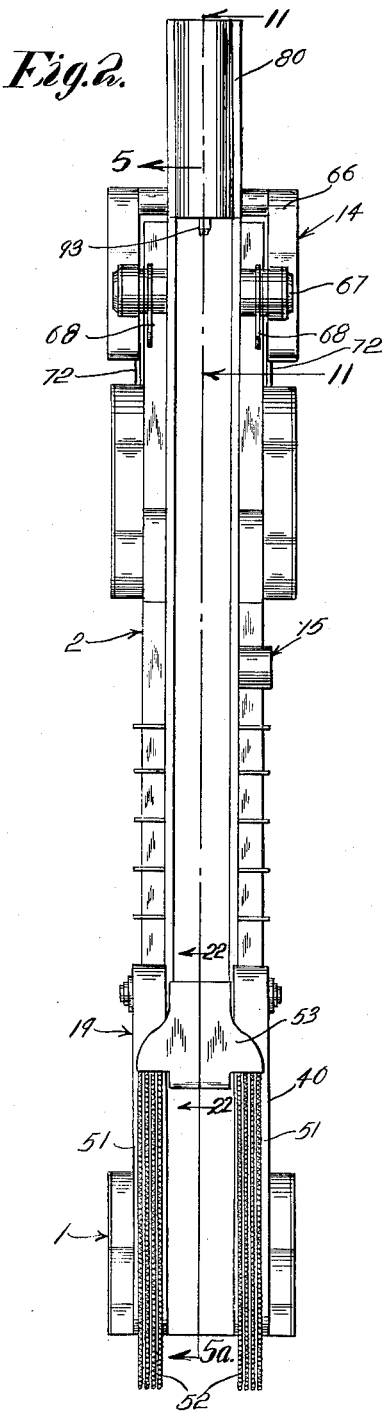
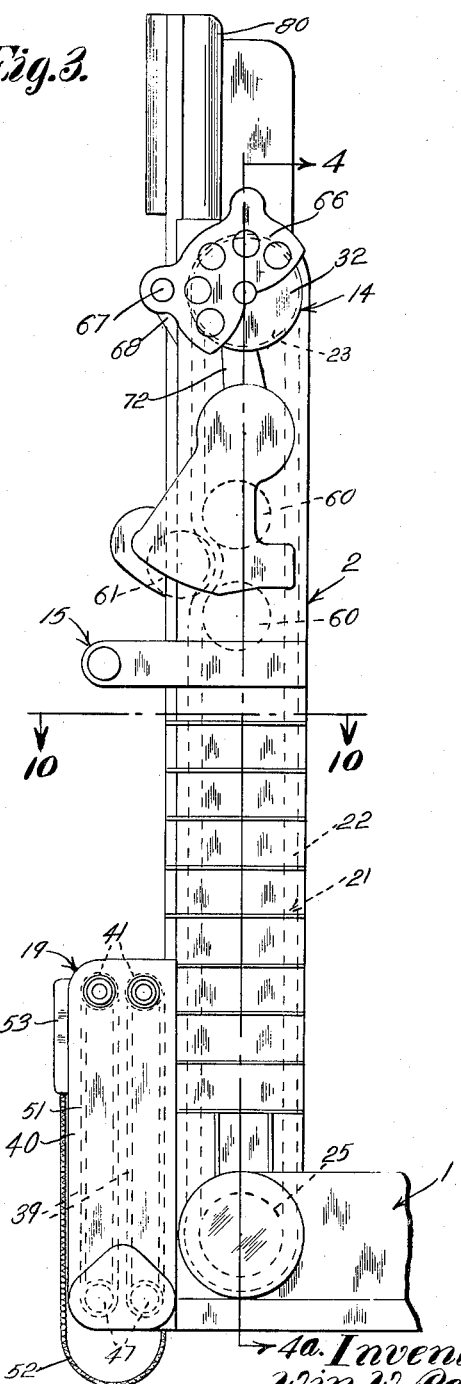
Inventor:
Wm. W. Paget.
by Charles F. Osgood,
Attorney.

Oct. 3, 1961  W. W. PAGET  3,002,560
MECHANIZED OIL FIELD DRILL RIG
Filed Jan. 13, 1955  11 Sheets-Sheet 3

Inventor:
Wm. W. Paget.
By Charles F. Osgood,
Attorney.

Oct. 3, 1961 W. W. PAGET 3,002,560
MECHANIZED OIL FIELD DRILL RIG
Filed Jan. 13, 1955 11 Sheets-Sheet 4

Inventor:
Wm W. Paget
by Charles F. Osgood
Attorney.

Oct. 3, 1961 W. W. PAGET 3,002,560
MECHANIZED OIL FIELD DRILL RIG
Filed Jan. 13, 1955 11 Sheets-Sheet 5

Inventor:
Wm. W. Paget.
By Charles F. Osgood
Attorney.

Oct. 3, 1961 W. W. PAGET 3,002,560
MECHANIZED OIL FIELD DRILL RIG
Filed Jan. 13, 1955 11 Sheets-Sheet 6

Inventor:
Wm W. Paget.
by Charles F. Osgood,
Attorney.

Oct. 3, 1961  W. W. PAGET  3,002,560
MECHANIZED OIL FIELD DRILL RIG
Filed Jan. 13, 1955  11 Sheets-Sheet 7
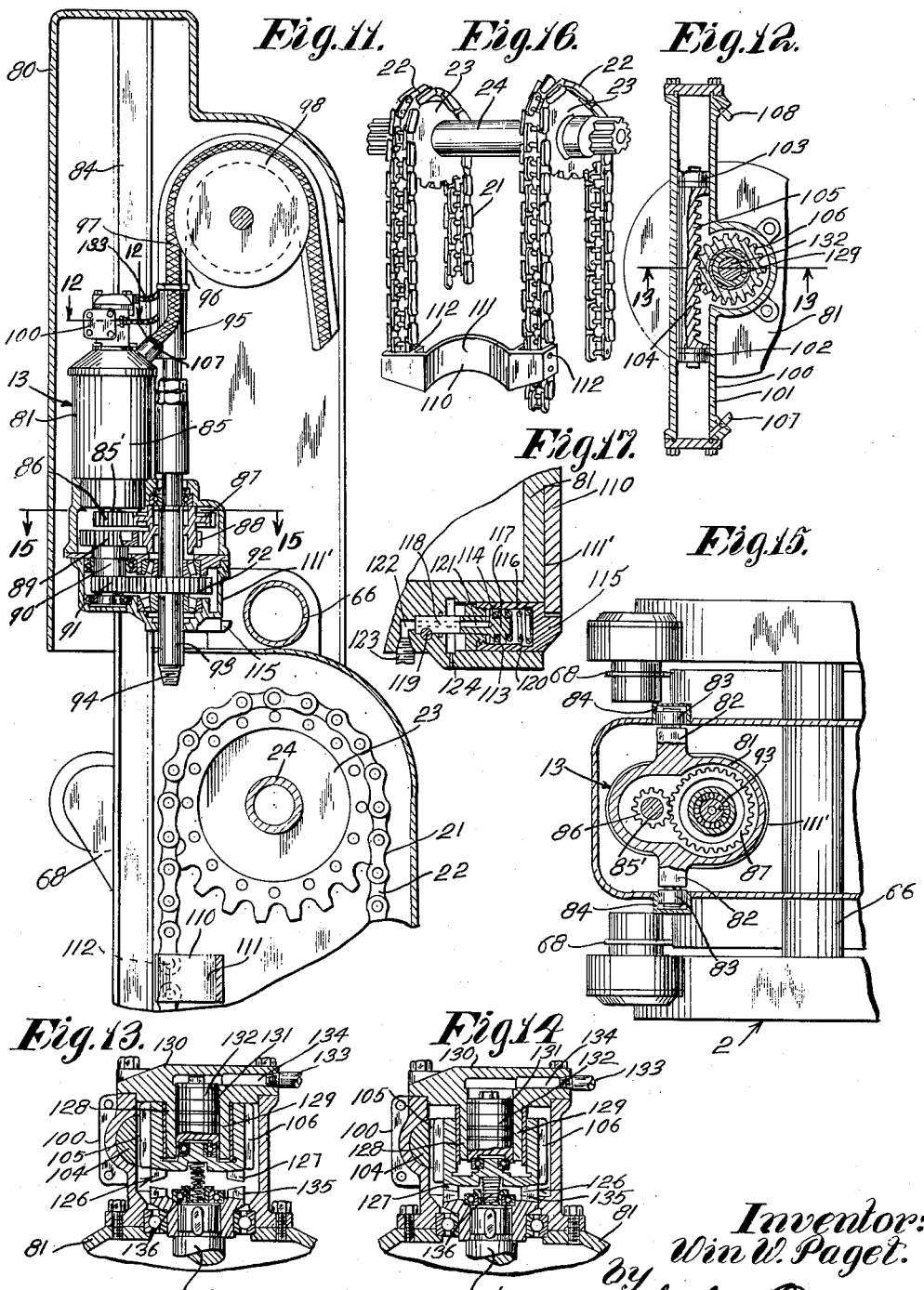

Oct. 3, 1961  W. W. PAGET  3,002,560
MECHANIZED OIL FIELD DRILL RIG
Filed Jan. 13, 1955  11 Sheets-Sheet 8

Inventor:
Wm. W. Paget.
By Charles F. Osgood,
Attorney.

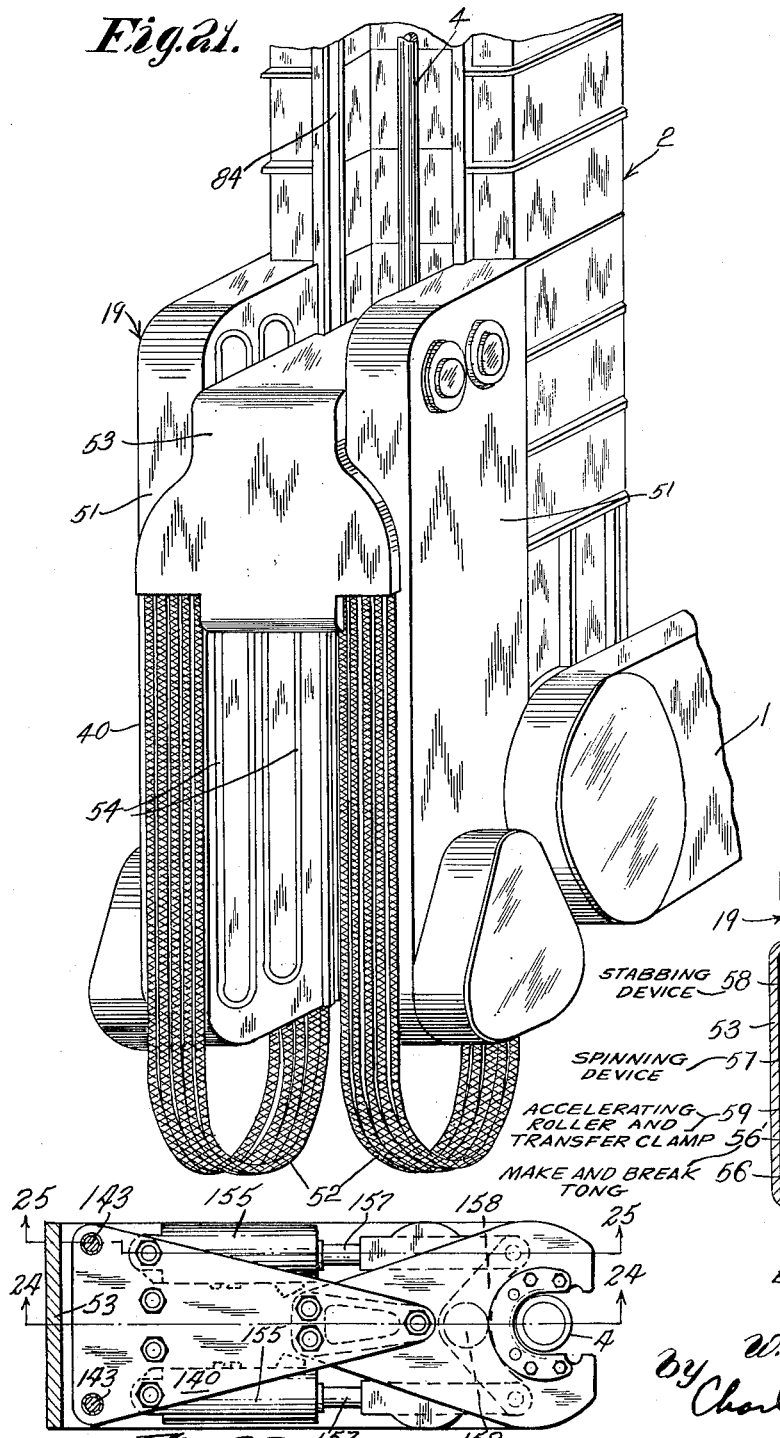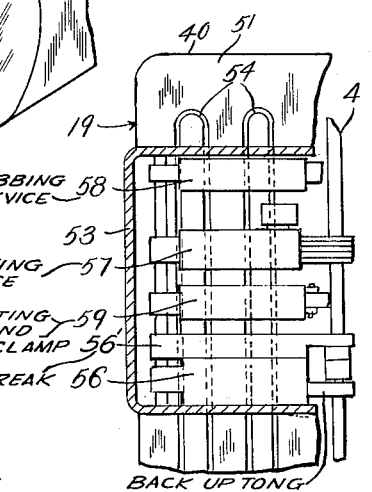

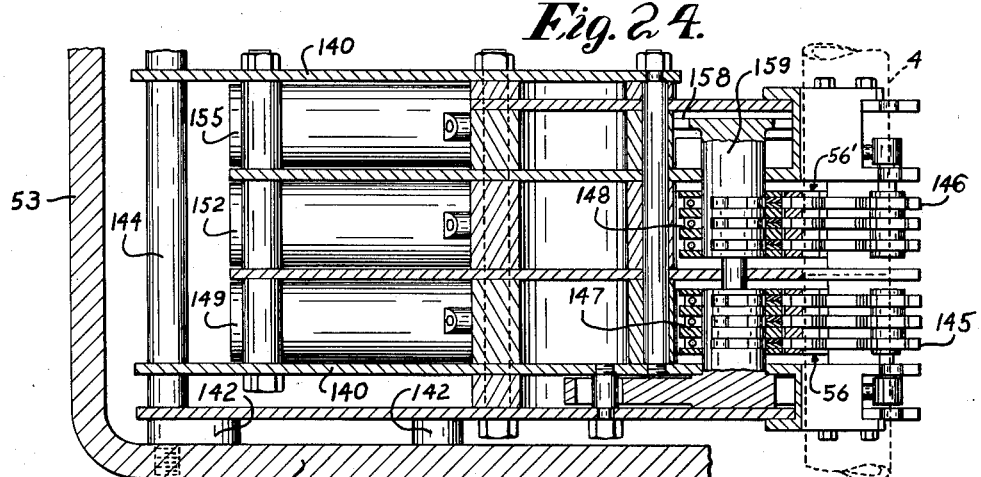
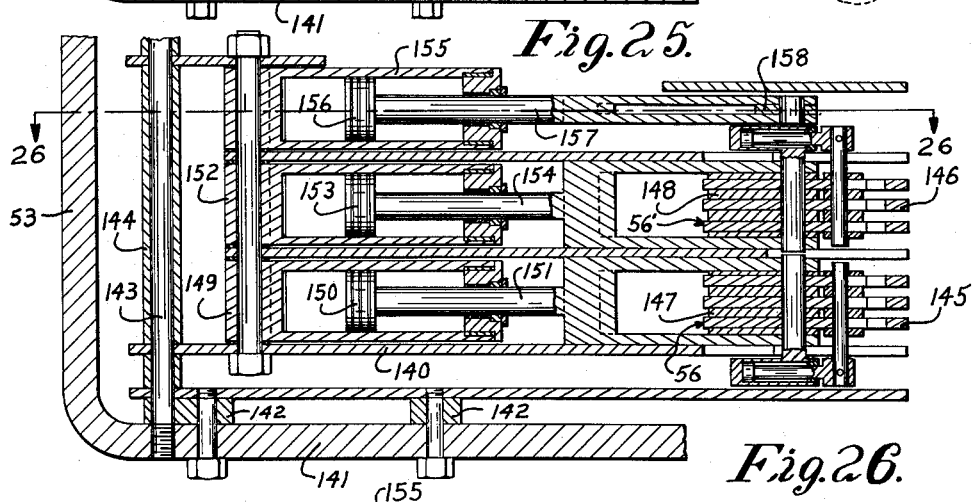
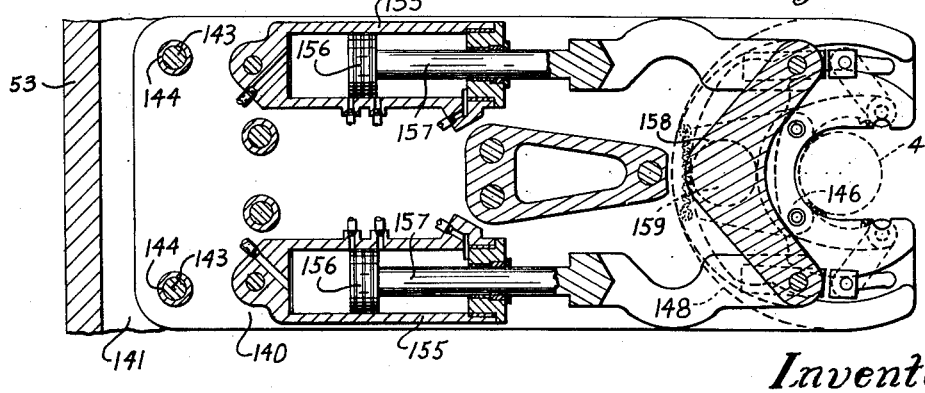

United States Patent Office 3,002,560
Patented Oct. 3, 1961

3,002,560
MECHANIZED OIL FIELD DRILL RIG
Win W. Paget, Mountain Brook, Ala., assignor to Joy Manufacturing Company, Pittsburgh, Pa., a corporation of Pennsylvania
Filed Jan. 13, 1955, Ser. No. 481,643
24 Claims. (Cl. 166—77.5)

This invention relates to drilling apparatus and more particularly to a mechanized oil field drill rig wherein the various operations are effected automatically by power operated mechanisms under operator control whereby the functions of the drill may be effected with a minimum of manual effort.

In known types of oil field drill rigs, particularly in those of the deep-hole type, the various operating functions are semi-automatic so that the drill pipe line may be lowered in the hole and raised from the hole without the drill pipe being touched by hand, entirely by power operated devices. Such semi-automatic equipment usually consists of power operated tongs which perform the stabbing, spinning and tonging operations while the drill pipe line remains stationary in the hole in a time consuming manner and automatic racking units are mounted in the derrick for stacking the drill pipe, for carrying the drill pipe to and from the center of the hole and for positioning the pipe in and for moving the pipe from the racking means. With such equipment, all the operations of the various units are controlled remotely by manipulation of control levers and control devices. In known instances, such semi-automatic equipment is hydraulically operated and control is effected by means of hydraulic control valves.

The present invention contemplates improvements over such known types of oil field drill rigs in that the drill pipe line may be raised, uncoupled, stacked and lowered, all by automatic mechanism under remote control and while the pipe line moves without interruption in or from the hole. The drill of the present invention embodies improvements in such known types of devices in that the various operations are effected rapidly and in an improved and more efficient manner. Making of the drill semi-automatic substantially reduces, and in some cases eliminates, the conventional method of making "round trips" with the drill pipe, with the latter requiring frequent manual handling of the pipe, thereby avoiding to a large extent, the strenuous physical assistance to manually operated tools as has heretofore been necessary.

It is therefore an object of the present invention to provide an improved mechanized oil field drill rig. Another object is to provide an improved oil field drill rig wherein the various means for effecting the operation of the machine are, to a large extent, mechanized and under remote control of the operator. Yet another object is to provide an improved mechanized oil field drill rig wherein the drill pipe line may be pulled from the hole and lowered in the hole by power operated devices which operate automatically to effect their various functions, thereby substantially reducing or entirely eliminating the arduous manual operations frequently required in the making and breaking of the joints, spinning of the pipe, elevating and stacking of the pipe sections, and stabbing. A further object is to provide a power operated tonging mechanism which operates to effect its operations while the pipe is either being hoisted or lowered in the hole, thereby substantially to speed up the overall drilling operation. A still further object is to provide an improved oil field drill rig of a unitized design resulting in a more compact and rugged construction. Still another object is to provide an improved oil field drill rig having improved feeding and rotating means for the drill pipe line. Another object is to provide an improved hoisting and feeding mechanism for an automatic oil field drill rig. These and other objects and advantages of the invention will, however, hereinafter more fully appear.

In the accompanying drawings there is shown for purposes of illustration one form which the invention may assume in practice.

In these drawings:

FIG. 1 is an elevational view in perspective of an oil field drill rig constructed in accordance with the preferred illustrative embodiment of the invention, with a portion of the drill base broken away.

FIG. 2 is an enlarged end elevation and FIG. 3 is an enlarged side elevation of the derrick structure and some of the associated parts of the drill rig shown in FIG. 1.

Figure 4:
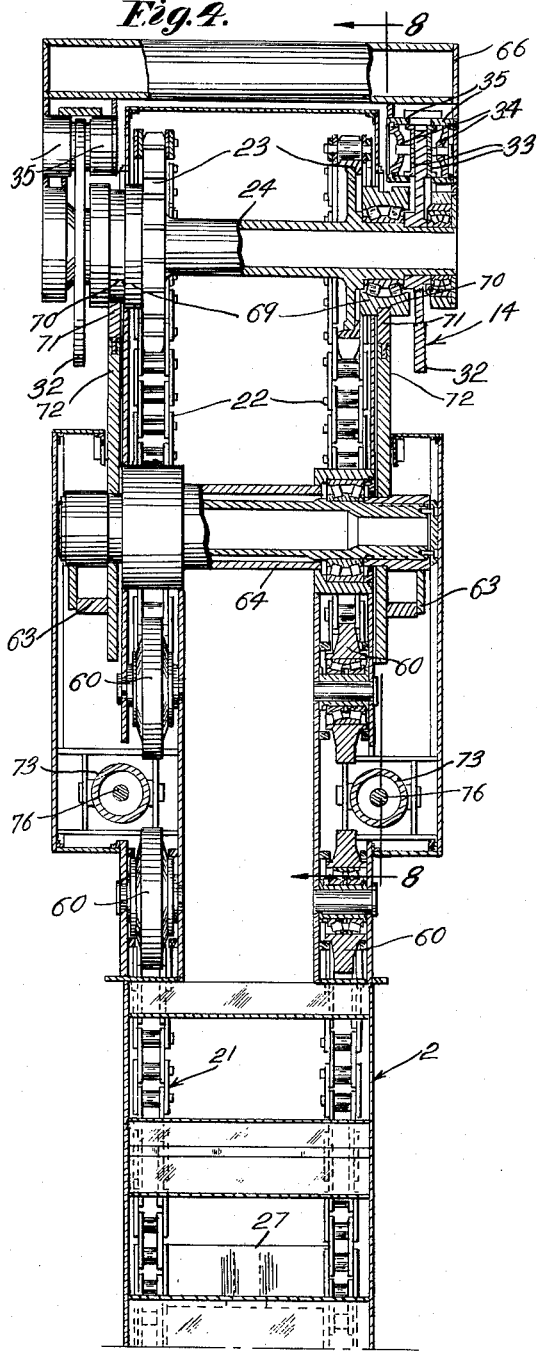
Figure 4A:
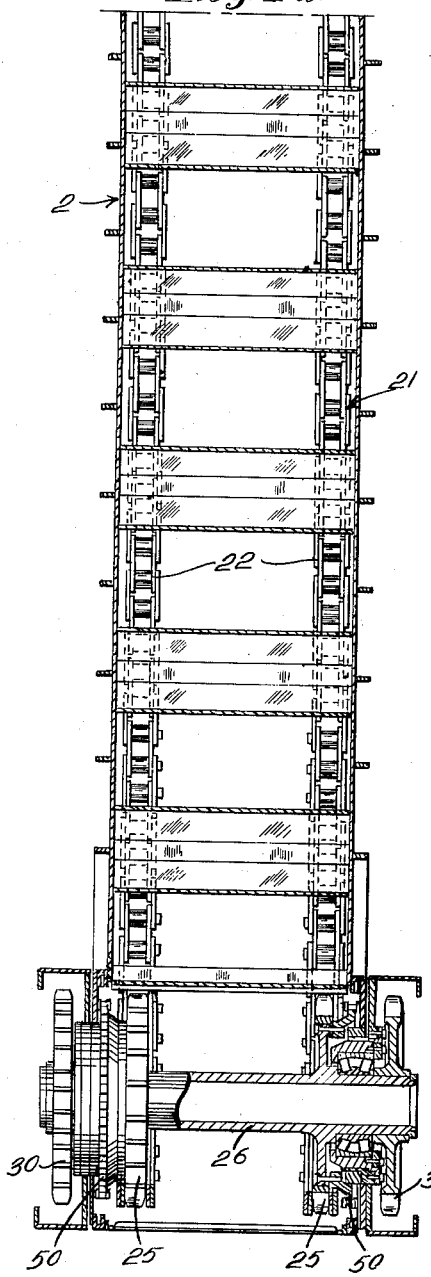

FIGS. 4 and 4a, taken together, constitute a vertical section taken on line 4—4a of FIG. 3, with parts omitted, showing a portion of the hoisting mechanism.

Figure 5:
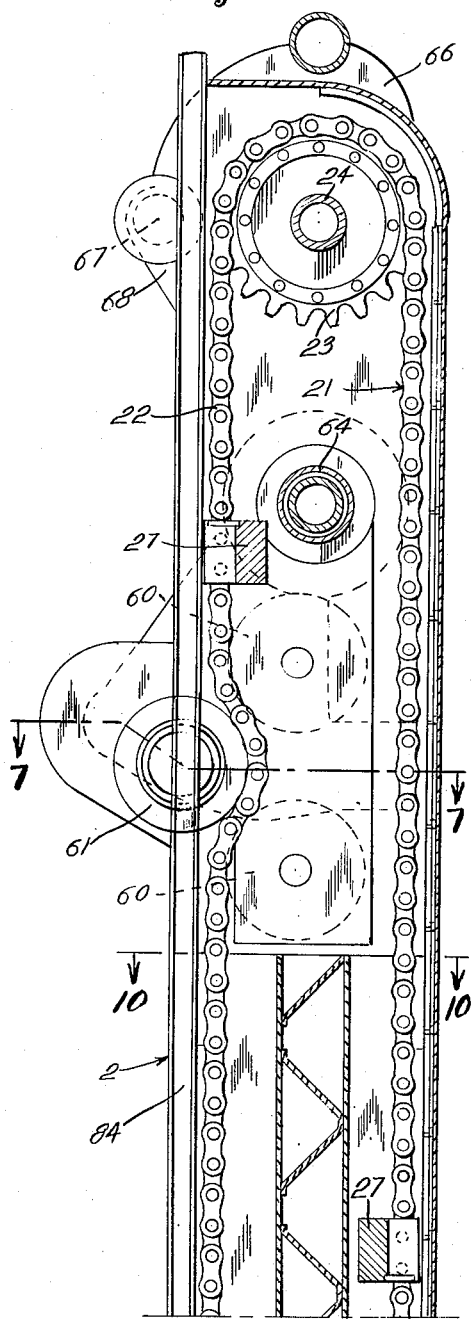
Figure 5A:
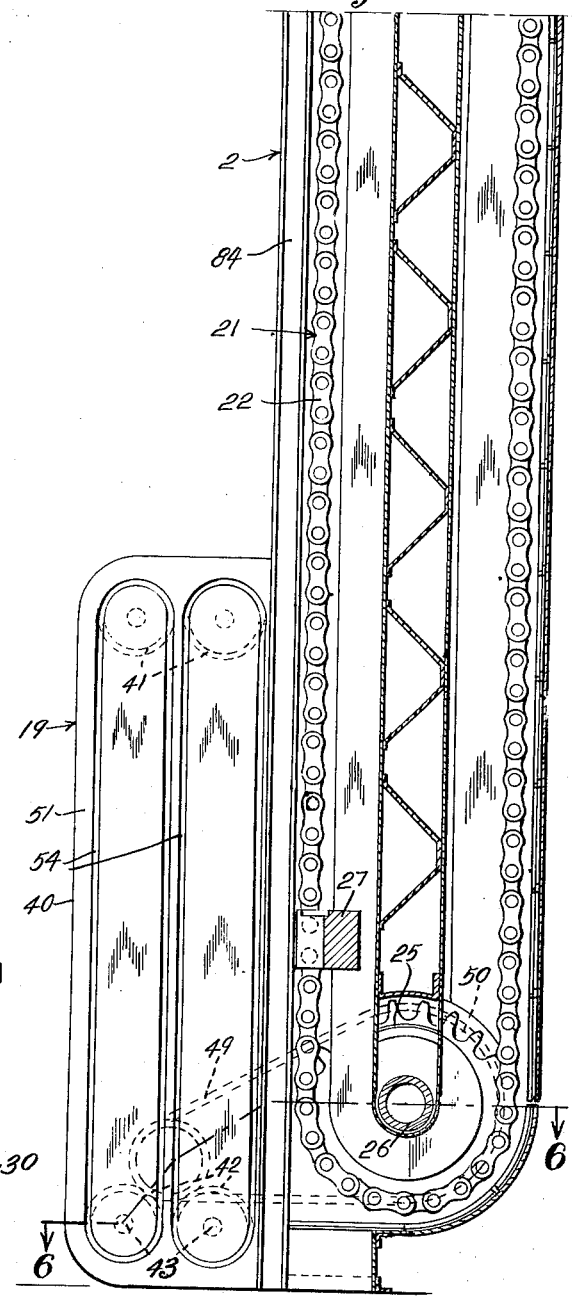

FIGS. 5 and 5a, taken together, constitute a vertical section taken on line 5—5a of FIG. 2, and showing the hoisting mechanism.

Figure 6:
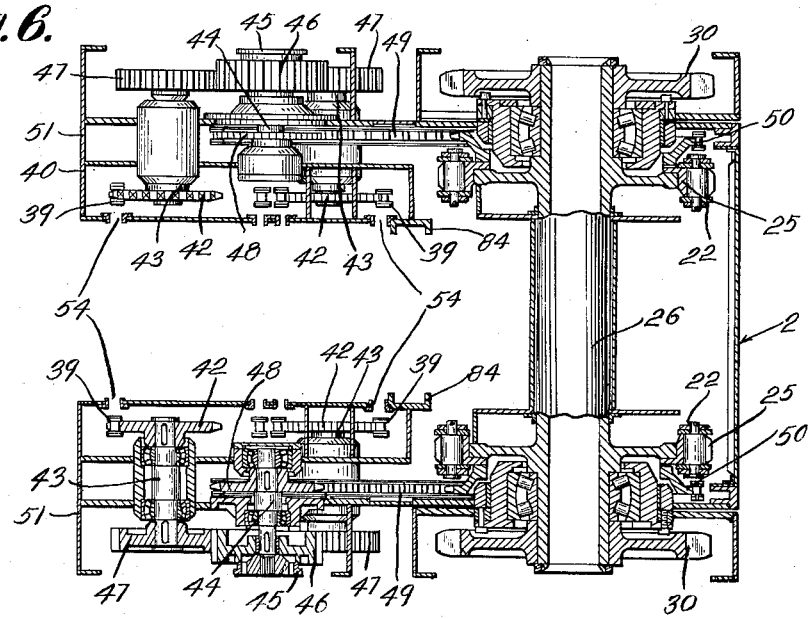

FIG. 6 is a horizontal section taken on the planes of line 6—6 of FIG. 5a, showing a portion of the automatic coupling mechanism and its housing with the side covers removed.

Figure 7:
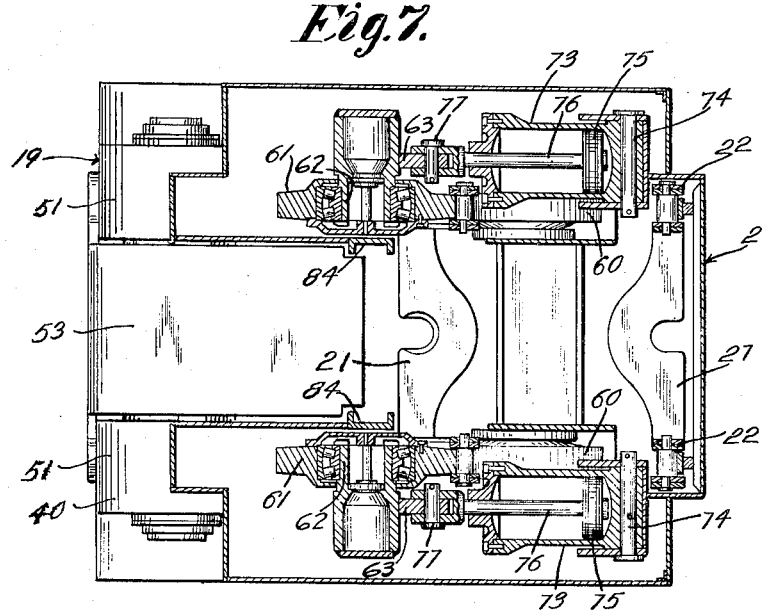

FIG. 7 is a horizontal section taken on the planes of line 7—7 of FIG. 5, showing the hydraulic operators for the transfer mechanism.

Figure 8:
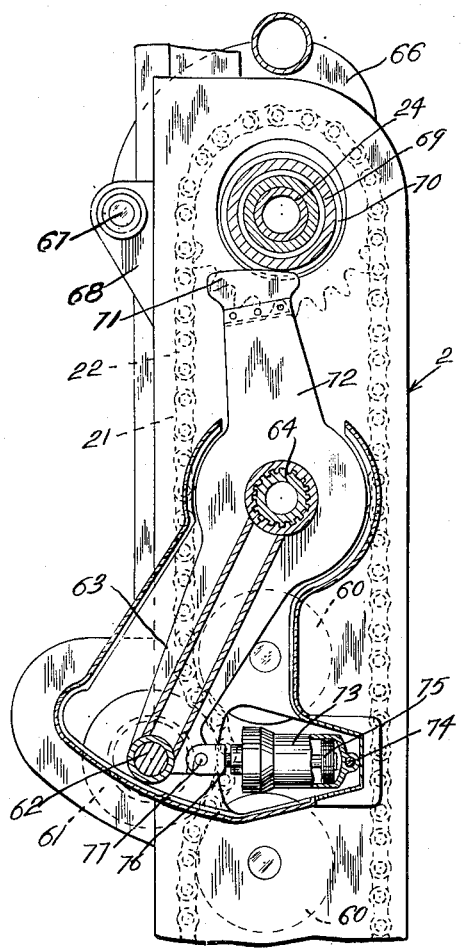

FIG. 8 is a vertical section taken on line 8—8 of FIG. 4, showing details of the transfer mechanism.

Figure 9:
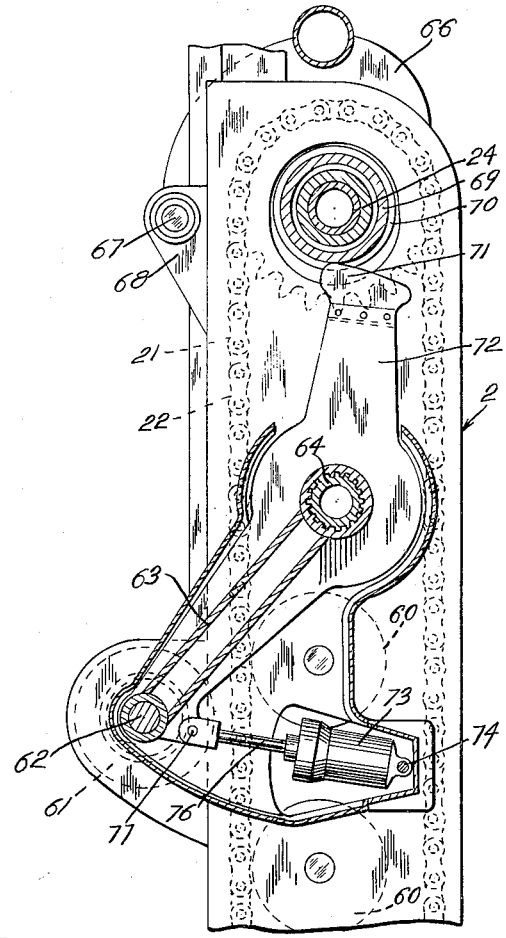

FIG. 9 is a view similar to FIG. 8, showing moving parts in a different position.

Figure 10:
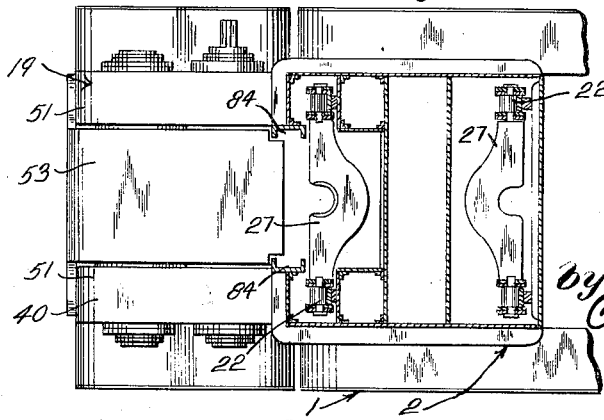

FIG. 10 is a horizontal section taken on lines 10—10 of FIGS. 3 and 5, showing details of the hoisting mechanism.

FIG. 11 is an enlarged vertical section taken on line 11—11 of FIG. 2, showing details of the drill head.

FIG. 12 is an enlarged horizontal section taken on line 12—12 of FIG. 11, showing details of the auxiliary torque motor.

FIG. 13 is a vertical section taken on line 13—13 of FIG. 12, showing the torque motor clutch.

FIG. 14 is a view similar to FIG. 13, showing moving parts in a different position.

FIG. 15 is a horizontal section taken on line 15—15 of FIG. 11.

FIG. 16 is a perspective view of the cross member or carrying-collar for the drill head.

FIG. 17 is a fragmentary sectional view showing the detent or latch for locking the drill head to the carrying-collar.

Figure 18:
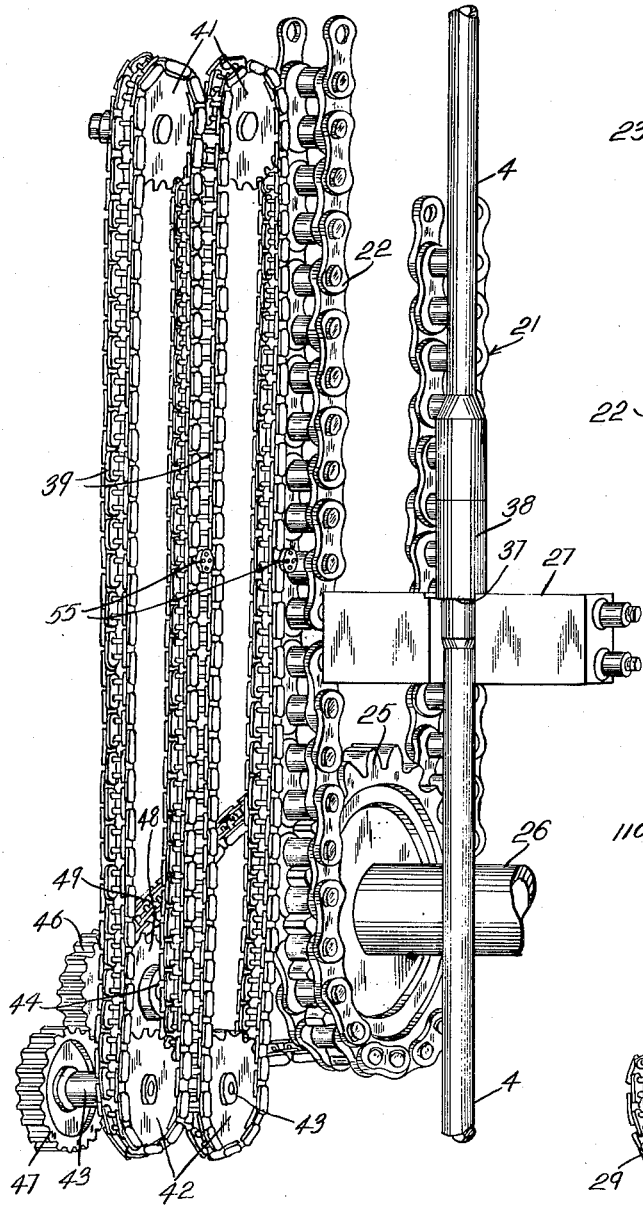

FIG. 18 is a fragmentary elevational view in perspective, showing details of the coupling and drive chains.

Figure 19:
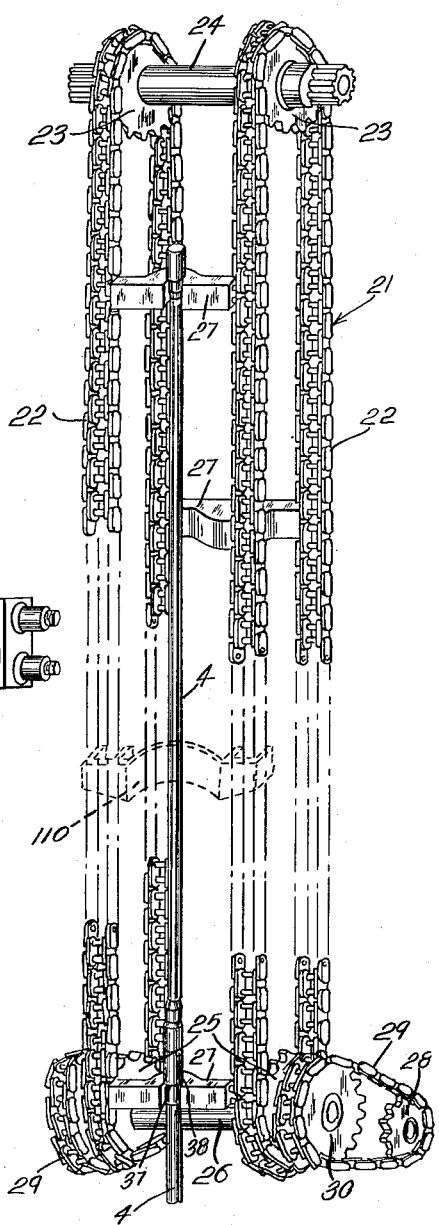

FIG. 19 is an elevational view in perspective, showing the elevator or hoisting chains.

Figure 20:
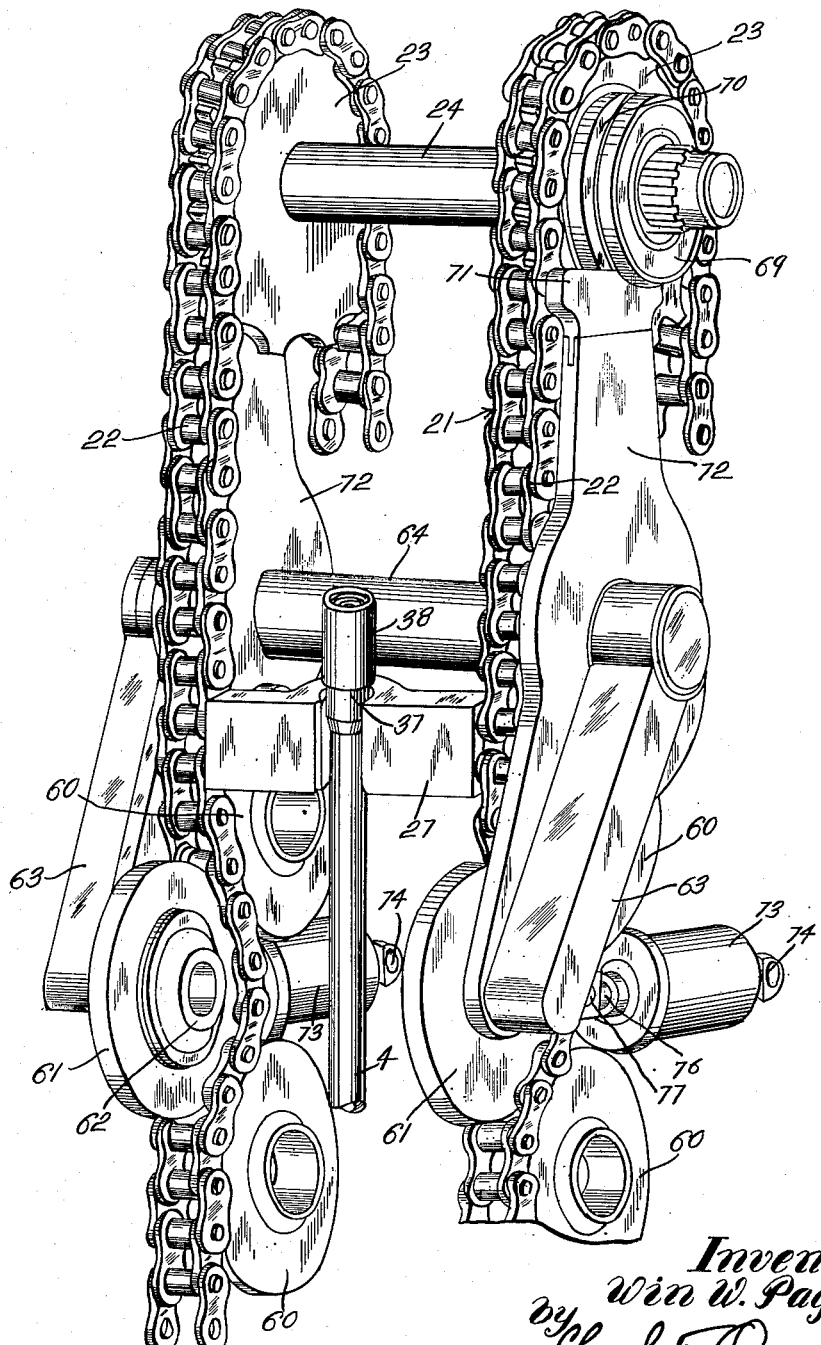

FIG. 20 is a fragmentary elevational view in perspective, showing details of the transfer mechanism.

FIG. 21 is a fragmentary elevational view in perspective, showing details of the automatic coupling mechanism.

FIG. 22 is an enlarged detail vertical section taken on line 22—22 of FIG. 2, showing the manner of mounting the tonging mechanism on its support within the housing of the coupling mechanism.

FIG. 23 is a plan view of the tonging mechanism shown in FIG. 22.

FIG. 24 is an enlarged central longitudinal vertical section taken on line 24—24 of FIG. 23.

FIG. 25 is an enlarged longitudinal vertical section taken on line 25—25 of FIG. 23.

FIG. 26 is a horizontal section taken on line 26—26 of FIG. 25.

The oil field rig of the present invention is of unitized construction, i.e. fabricated in sections, so that the drill may be dismantled and readily transported from place to place and set up at the desired location and, in order that the overall size of the drill may be visualized, it might be stated that in FIG. 1 the drill has its derrick structure extending upwardly to a height of approximately sixty five feet and the assembly is approximately forty feet wide and is substantially longer than it is wide, the length of the unit depending on the number of drill pipe racking units required for the particular depth of hole being drilled. Evidently, these proportions may vary to suit different conditions.

The base structure of the drill rig is generally designated 1 and the upright derrick structure is generally designated 2, the pipe elevating conveyor is designated 3, the string of drill pipe or drill pipe line is designated 4; 5 indicates the drill pipe racks, 6 are the power units or prime movers, 7 are mud tanks embodied in the base, and 8 are the suction lines leading from the tanks to conventional mud pumps; 9 indicates the well casing sections shown in position on a casing conveyor disposed on top of the drill pipe rack, 10 are the casing-dolly tracks, and 11 is the casing drawbridge. The hoisting drum and sand reel mechanism is generally designated 12 and mounted at the upper portion of the derrick structure is a drill head generally designated 13 and a braking mechanism generally designated 14. The pipe sections are fed to or withdrawn from the automatic coupling mechanism by any conventional means known to workers in the art and generally designated 15 in FIG. 1.

As above mentioned, the drill rig is highly sectionalized or unitized so that its parts or sections may readily be assembled or dismantled and by making the mud tanks 7 part of the base, the structure is simplified and made more compact. Further, the mud tanks 7 with their bottom surfaces of large area distribute the weight of the drill over the ground, dispensing with the conventional wooden mats.

The drill pipe sections are stored or stacked within a housing 16, also made up in sections which may also, partly at least, enclose the mud tanks, and a conveyor 17 arranged within this housing serves to move the pipe sections horizontally from their stacked or stored position within the housing to an open space 18, and the pipe elevating conveyor 3 serves to pick up the pipe sections on the conveyor 17 and to elevate them vertically as shown in FIG. 1.

It will be noted that arranged within the upright frame of the derrick structure 2 is a hoisting mechanism generally designated 21 of the type known as a "chain pull-down" comprising parallel endless chains 22 movable in vertical orbits and which, at their upper portions, pass around idler sprockets 23 carried by a cross shaft 24 journaled in bearings suitably supported within the upper portion of the derrick frame. The endless chains at their lower portions pass around drive sprockets 25 fixed to a cross shaft 26 suitably supported within bearings arranged within the lower portion of the derrick frame. Secured to these endless chains at equally spaced points along their lengths are a plurality of, herein desirably three, cross members or elevator yokes 27 (see FIGS. 18, 19 and 20). Drive sprockets 28 (FIG. 19) driven by at least one of the prime movers 6 are connected by endless drive chains 29 to sprockets 30 fixed to the ends of the cross shaft 26. The sprockets may be driven in any suitable manner in either of opposite directions to effect drive of the hoisting chains in either direction.

As shown in FIG. 4, the brake mechanism 14, which is used principally in handling casing, comprises brake disks 32 secured to the ends of the cross shaft 24 and with which conventional "spot" type brake elements or brake plungers 33 are engageable for braking rotation of the upper cross shaft, thereby to brake the endless hoisting chains 22. These brake elements are actuated by pistons 34 contained in hydraulic cylinders 35.

The cross yokes 27 on the hoisting chains are engageable with collarlike enlargements or shoulders 37 provided by the elements or threaded boxes 38 of the tool joints which couple the pipe sections together (see FIGS. 18, 19 and 20), and as the chains are circulated in their orbits the cross yokes engage and elevate the drill pipe, as will later be more fully explained. Thus, depending upon the direction in which the hoisting chains are circulated, they provide means for continuously elevating or lowering the coupled pipe line or drill string.

The automatic coupling mechanism 19 comprises means for coupling and uncoupling the tool joints of the pipe line and the coupling and uncoupling means moves in unison with the hoisting chains at the same speed and in the same direction as the chains. This coupling mechanism is supported in an upright position on the base of the drill rig intermediate the derrick 2 and the pipe elevating conveyor 3, as shown in FIG. 1, and comprises pairs of parallel endless chains 39 guided for circulation in parallel vertical orbits within a housing 40 of the coupling mechanism (FIGS. 5a, 6 and 18). These chains 39 pass around upper idler sprockets 41 and lower drive sprockets 42 and the latter are secured to parallel shafts 43 suitably journaled within the housing 40. These parallel shafts may be driven un unison by cross shafts 44 likewise suitably journaled within the housing 40 and connectible to these shafts, as by sliding clutches 45 (FIG. 6), are spur gears 46 meshing with and driving spur gears 47 secured to the parallel shafts 43. Sprockets 48 secured to the shafts 44 are driven by endless drive chains 49 engaging drive sprockets 50 driven by the lower cross shaft 26. The clutches 45 may be manually or otherwise disconnected to release the coupling mechanism from its drive.

The various devices of the pipe joint make and break, stabbing and spinning means are hydraulically operated and are secured to and supported by these pairs of parallel chains 39 within the housing 40 of the coupling means intermediate vertical side casings or upright frames 51 (see also FIG. 21) and liquid under pressure may be supplied to these several devices through groups of flexible hoses 52 draping from a vertically movable support 53 of the coupling mechanism. The inner walls of the side casings or frames 51 are slotted at 54 along the orbits of the pairs of chains 39 and the movable support 53 has connecttions at 55 (FIG. 18) with these chains.

There are actually five units or devices included in the automatic coupling mechanism; all of these units being mounted within the movable frame 53 and supported by the four parallel chains 39 within the housing 40; there being two chains within the side casings or frames 51 at each side of the housing. It is therefore evident that the coupling mechanism is supported by the pairs of parallel chains 39 and each of the latter is of such length that the coupling mechanism will move in to engage the tool joint, travel with the tool joint a certain distance during movement of the drill pipe line, and then move out and return to engage the next tool joint, all in perfect synchronism.

The five units or devices enclosed in the moving support 53 may be arranged and constructed in various manners and herein consist of conventional hydraulically operated back-up tongs 56, hydraulically operated operating tongs 56′, a power spinning device 57, a conventional stabbing device 58 and an accelerating roller and transfer clamps 59 (FIG. 22), and the back-up and operating tongs 56, 56′, later described in some detail, may be generally similar to those disclosed in my copending application Serial No. 428,979, filed May 11, 1954, now matured into Patent No. 2,760,392, granted August 28, 1956, while the spinning device 57 may be generally similar to that disclosed in my copending application Serial No. 335,477, filed February 6, 1953, now matured into Patent No. 2,746,329, granted May 22, 1956. Evidently, the casings of the devices of the application may be attached directly to the vertically movable support 53. Since the detail structures of the stabbing device and the accelerating roller and transfer clamp do not per se enter into the present invention, a detailed description thereof is herein unnecessary. The five units of the coupling mechanism as later mentioned may have conventional automatic controls such as usual knock-off means or cams actuated by movement of the support 53 relative to the coupling housing, for controlling usual valves which may effect actuation of the several devices in the required sequence.

As is well known to those skilled in the art, the back-up tongs engage the drill pipe line to prevent the lower half of the tool joint between drill pipe sections from rotating during the make-up or break-out operation, while the operating tongs engage the upper half of the tool joint either to start the initial breaking motion or to complete the final making motion during uncoupling or coupling of the joint. The spinning device serves to complete the operation of unscrewing the joint after the tongs have broken the joint loose or to effect initial engagement of the joint parts prior to tightening of the joint. The stabbing device engages the pipe line to provide for initial engagement of the joint parts without damaging of the threads and acts like a "spring hook" swiftly to lift the upper pin parts of the joint from the lower box part during disengagement of the joint. The accelerating roller and transfer clamps form the lower half of the mechanism which engages the stationary stand of drill pipe and brings it up to the speed of the moving pipe line or drill string.

Evidently, the five units or devices of the coupling mechanism referred to may assume any suitable form and only the tonging mechanism is described later in detail since the others do not per se enter into the present invention, other than in the manner of association with the tonging mechanism and the manner of cooperation with their moving and supporting chains 39 and the elevating chains 22 of the hoisting mechanism.

From the foregoing it will be evident that the cross yokes 27 on the hoisting chains 22 are so spaced apart on the chains that they engage the shoulder 37 on the lower half of a tool joint to elevate the pipe line and during elevation of the pipe line the holding tongs, the make and break tongs, the spinning device, the stabbing device and the accelerator roller and transfer clamp move with the pairs of parallel chains 39 at the same speed as the pipe line and function automatically to uncouple the tool joints as the pipe line moves upwardly. Conversely, these five devices of the coupling mechanism function automatically to make or couple the tool joint as the pipe line is lowered by the hoisting chains 22 during reverse drive of the latter. The five units of the coupling mechanism therefore may move either upwardly or downwardly with the pairs of parallel chains 39 whose motion is synchronized with that of the hoisting chains. It will thus be seen that the raising and lowering means for the make and break tonging mechanism is coordinated with the elevating mechanism for the drill string so that the tonging mechanism moves at the same speed as the drill string as the latter is elevated or lowered in the hole being drilled. The groups of hoses 52 are connected to suitable sources of liquid under pressure and lead to the hydraulic actuators of the several hydraulically operated devices of the coupling mechanism in a well-known manner.

The cross yokes 27 on the hoisting chains 22 are so spaced apart on the hoisting chains that the distance between the face of the cross yoke which engages the shoulder 37 of the lower box part of a tool joint and a similar face on the following cross yoke is equal to the length of each of the orbital paths or travel circuit of the parallel chains 39 and this distance of the particular structure disclosed may be exactly 30 feet. The distance between the box shoulder 37 of the tool joint and the following box shoulder of the adjacent pipe section is slightly less than the distance between the cross yoke faces above mentioned, and this difference in distance allows the lower cross yoke to pass around the lower sprockets 25 as the hoisting chains circulate in their orbits so that this cross yoke may engage the drill pipe below the box shoulder without any fouling or interference. The parallel chains 39, in the construction disclosed, make three complete circuits of their orbits while the elevating chains make a single orbital circuit.

At a point approximately two-thirds of the distance between the parallel axes of the upper and lower sprocket-shafts 24 and 26, there are located "back-up" rollers 60 disposed behind each of the hoisting chains 22 (FIGS. 4, 5 and 20) and these rollers are mounted on parallel shafts suitably journaled within the derrick frame. Rollers 61 journaled on aligned axes and supported by shafts 62 are carried at the lower ends of swinging lever arms 63 which are secured to the ends of a cross shaft 64 likewise suitably journaled within the derrick frame. As shown, these rollers 61 are engageable with the outer sides of the hoisting chains 22 intermediate the back-up rollers 60 to depress the chains inwardly at points located between the back-up rollers to move the upper cross elevator or yoke 27 inwardly to release the same from the upper pipe section and at that time the pipe line is supported by the lower elevating or cross yoke. The hoisting chains are held depressed between the rollers until the released upper elevator yoke passes around the upper idler sprockets 23 entirely clear of the pipe line and thereafter, the rollers 61 swing outwardly to permit the upwardly moving runs of the hoisting chains to move back into their normal vertical paths so that the next elevator yoke will not foul at the bottom.

To permit depression of the hoisting chains between the back-up rollers 60 there must be slack concurrently placed in the chains to permit the latter to be depressed inwardly and such slack is provided by mounting the upper cross shaft 24 of the idler sprockets 23 on a pivoted frame 66 pivotally mounted at 67 on brackets 68 integral with the derrick frame. This upper cross shaft 24 is mounted on bearings 69 whose outer races are circumferentially grooved at 70 and engaged in these grooves are cams 71 (FIGS. 4 and 9). These cams are secured to upwardly extending lever arms 72 formed integral with the lever arms 63. Thus, as the rollers move inwardly to depress the hoisting chains between the back-up rollers, the arms 72 move the cams 71 to cause the frame 66 to swing downwardly to lower the upper idler sprockets 23, as shown in FIG. 8. When the lever arms 63 are swung outwardly to position the rollers 61 to release the depressed hoisting chains, as shown in FIG. 9, the lever arms 72 position the cams 71 to cause the frame 66 to swing upwardly about its pivot to elevate the upper idler sprockets.

The lever arms 63 and 72 may be swung in unison about their pivots hydraulically by means of hydraulic cylinders 73 pivoted at 74 on the derrick frame and containing reciprocable pistons 75 having their piston rods 76 pivotally connected at 77 to the lower ends of the lever arms 63 (FIGS. 7, 8 and 9). Any suitable control valve means may be provided for regulating flow of liquid pressure to these cylinders and for venting liquid from the cylinders, and such control means may be automatically actuated by conventional knock-off means responsive to movement of the hoisting chains or elevator yokes, or by a cam mechanism actuated by the idler shaft, to effect actuation of the hydraulic cylinders at the proper intervals.

The drill head 13 may be retracted in any suitable manner within an upper housing 80 secured to the derrick frame, during running of the pipe line or drill string into and out of the hole, and in FIG. 11 the drill head is shown in its raised retracted position. The drill head is of a unitary design and has a casing 81 provided with lateral arms 82 which carry guide rollers 83 received in vertical guideways 84 secured to the derrick frame. This casing encloses a vertical motor 85 which may be of any suitable type and the vertical motor shaft 85' has a spur pinion 86 fixed to its lower end, and this pinion meshes with and drives a spur gear 87 with which a smaller spur gear 88 rotates. The gear 88 meshes with and drives a spur gear 89 secured to a vertical shaft 90 journaled within the casing head. Secured to the shaft 90 is a spur gear 91 meshing with a larger spur gear 92 fixed to a vertical drive shaft or spindle 93, likewise suitably journaled within the head casing; the latter having a threaded pin 94 at its lower end adapted for attachment to the upper tool box of the drill pipe line. The shaft 93 is tubular and is connected through a usual water swivel 95 to a water hose 96. A flexible power conductor 97 for the motor 85 and the flexible water hose pass up over a guide roll or pulley 98 journaled on the upper housing of the derrick frame and this flexible conductor and hose respectively lead to any suitable sources of power and water or other drilling liquid. Also, control conductors or conduits may lead from a suitable motor control device up around the guide roll into connection to suitable power sources, thereby to enable the operator to control the drill motor from a remote point, in a well-known manner.

In order to apply a powerful torque to the drill pipe there is provided "rodding-up" means comprising an auxiliary motor 100 (FIG. 11), desirably of the hydraulically operated reciprocating type, having a hydraulic cylinder 101 (FIG. 12) mounted transversely on the top of the motor casing and reciprocable in this cylinder are oppositely acting pistons 102 and 103 connected by a piston rod 104. This piston rod is formed with rack teeth 105 meshing with a spur gear 106 connectible as later described to the upper end of the motor power shaft. Flexible conduits 107 and 108 are connected to the opposite ends of the cylinder 101 and lead up around the guide roll 98 to a suitable source of liquid under pressure. Any suitable remotely located control valve means may be provided to regulate flow of liquid pressure through these conduits to the cyliinder and for venting these conduits.

Attached to the hoisting chains 22 is a cross member or so-called carrying-yoke 110 having a curved or partially circular inner portion 111 adapted snugly to fit around the curved lower portion 111' (FIG. 11) of the drill casing and this cross member is connected to the chains at 112 at a point between certain of the elevator yokes 27 (FIGS. 11, 16 and 19). Under certain conditions, the connections 112 may be releasable so that the carrying-collar 110 may be detached from the hoisting chains during the automatic coupling and uncoupling operations as the pipe line is raised or lowered in the hole. In FIGS. 4, 4a and 5, 5a the carrying-yoke 110 is detached from the hoisting chains. If desired, instead of the elevator yokes 27 there may be provided three carrying-yokes 110 and during pulling and running in of the pipe line there may be fitted within the carrying-yoke is a suitable adapter-yoke, and, of course, this adapter-yoke is detached during the drilling operation. Any suitable means may be employed for locking the drill head within the carrying-yoke and herein there is shown a releasable detent comprising a plungerlike latch 113, reciprocable in a bore 114 of the drill head casing 81, having a projection or detent 115 adapted to underlie the drill carrying-yoke 110 when the latter is in engagement with the lower portion of the drill head casing, as shown in FIG. 17. This latch has a bore 116 containing a relatively stationary piston 117 having a stem 118 rigidly secured at 119 to the motor casing. Arranged between this piston and the latch is a coil spring 120 constantly urging the latch outwardly toward its connected or locking position. A fluid passage 121 in the stem 118, leads to the bore 116 and is connected through a passage 122 to a liquid supply conduit 123 which may also pass up around the guide roll 98. When fluid is supplied to the latch-bore, the latch may be shifted to released position against the action of the spring. The bore containing the plunger is vented through a vent port 124. The drill head may be raised and lowered by any conventional means as, for example, the cable of the sand reel 12 or by a separate hoisting cable. When the drill head is lowered from its retracted position shown in FIG. 11, it may be brought into engagement with the carrying-yoke 110 and locked in position on the collar by the detent 115. When the drill head is connected to the hoisting chains 22 the drive for the latter may be reversed in a suitable manner so that the hoisting chains may at that tiem serve as "pull-down chains" for feeding the pipe line downwardly to apply a feeding pressure to the drill bit when starting the hole. The hoisting chains 22 may also be employed to retract the drill head. When it is desired to retract the drill head to a position above the hoisting mechanism (FIG. 11) the detent 115 is, of course, released hydraulically.

The head motor when lowered may be employed to attach the vertical spindle 93 to the upper end of the drill pipe and may also be employed to rotate the drill pipe during the drilling operation. The auxiliary hydraulic motor 100 at the top of the head motor may be employed to apply a powerful "buck-up" torque to the driving spindle and may also be employed to release a tight joint between the spindle and the drill pipe.

A hydraulically operated releasable connection or clutch 126 (FIGS. 13 and 14) is provided between the auxiliary torque motor 100 and the motor shaft comprising a shiftable jaw clutch member 127 formed integral with the spur gear 106 which is mounted for axial sliding movement on a bearing sleeve 128 supported by the depending cylindrical portion 129 of a detachable upper head 130. Formed in the cylindrical portion 129 is a bore 131 of a hydraulic cylinder containing a reciprocable piston 132. A conduit 133 is adapted to supply liquid under pressure through a passage 134 to the upper end of the cylinder bore and acts on the upper surface of the piston to force the latter downwardly thereby to shift the clutch member 127 into connection with the jaw clutch member 135 keyed to the upper end of the motor shaft 85'. A coil spring 136 constantly urges the clutch member 127 toward its uppermost released position. Thus, when it is desired to apply powerful hydraulic torque to the spindle 93 the clutch may be connected and during normal rotation of the rod line by the motor 85 this clutch is released. Any suitable remotely located control valve means may be provided for controlling the flow of liquid-pressure to the cylinder-bore 131 and for venting the cylinder-bore.

The make and break tonging mechanism is disclosed more in detail in FIGS. 23, 24, 25 and 26 and includes the lower back-up tongs 56 and the upper operating tongs 56'. The tonging mechanism has a frame 140 supported on the horizontal bottom 141 of the support 53 by support elements 142 and is secured in position by upright parallel rods 143 having spacing sleeves 144 between the top and bottom plates of the frame 140, as shown in FIG. 24. These same rods hold the other units 57, 58 and 59 of the coupling mechanism in position on the support 53 with similar spacing sleeves surrounding the rods between the separate units. Thus as the support 53 moves up and down with the endless chains 39 the tonging mechanism and other units move in unison therewith. The back-up tongs have gripping jaw means 145 while the upper operating tong has gripping jaw means 146 and these jaw means are respectively carried by rocking heads 147 and 148 (FIGS. 24 and 25) respectively of laminated plate construction as disclosed more in detail in the above mentioned Patent No. 2,760,392. One of the rocking heads is shown in dotted lines in FIG. 26, and side links connect each head with its jaw means, as is also described in the patent. Pairs of hydraulic cylinders 149 (FIG. 25) contain reciprocable pistons 150 having their piston rods 151 operatively connected to the rocking head 147 of the lower jaw means 145 for opening and closing the latter out of and into gripping engagement with the drill pipe line below a conventional pipe joint to be broken. Arranged above the cylinders 149 is another pair of hydraulic cylinders 152 containing reciprocable pistons 153 having their piston rods 154 connected to the rocking head 148 for and upper jaw means 146 for opening and closing the latter into and out of gripping engagement with a drill pipe section above the joint. Upper hydraulic cylinders 155 (see also FIG. 26) contain reciprocable pistons 156 having piston rods 157 pivotally connected to the arms of a yoke 158 secured to the upper end of a rotatable cam shaft 159 for further turning the rocking head 148 of the upper jaw means after the upper pipe section is gripped for turning the upper pipe section to make or break the joint. From the foregoing it will be evident that the drill pipe line below a joint may first be gripped and held against rotation by the lower jaw means 145 and the pipe section above the joint may be gripped by the upper jaw means 146 and thereafter the upper gripping means may be turned to effect turning of the pipe section to break or make the joint and thereafter the joint may be coupled or uncoupled. These steps are effected by the three pairs of hydraulic cylinders and, as previously stated, the several pairs of hydraulic cylinders may have operating liquid supplied thereto and exhausted therefrom under the control of conventional valves as disclosed in the patent, having conventional automatic controls such as usual knock-off means or cams actuated by movement of the support 53 relative to the coupling housing or frame 51, so that the valves may control the several pairs of cylinders in the desired sequence.

The general mode of operation of the improved oil field drill is as follows: During the normal hole drilling operation, i.e. during rotation of the drill bit to effect drilling, the pipe line may be rapidly rotated by the motor 85 of the upper drill head attached to the upper end of the pipe line and as the hole deepens, additional sections of drill pipe may be added between the drill head and the pipe line in a conventional manner. The auxiliary motor 100 at the top of the drill head may supplement or supplant the motor 85 during loosening of a tight joint between the motor driven spindle 93 and the upper pipe section or during tightening of the joint between the spindle and the upper pipe section, as desired. During drilling, the conventional mud pump may supply drilling fluid from the mud tanks 7 through the hose 96 to the swivel 95 of the drill head. As the pipe line is rapidly rotated by the drill head motor 85, the hoisting chains 22 may be employed as pull-down chains to effect forcing of the pipe line downwardly to feed the drill bit toward the work and these chains may also serve to retract the drill head to elevate the pipe line. After the hole is started, the feed, of course, will normally be caused by the weight of the pipe line and in deep hole drilling, some of the weight of the pipe line must be removed from the drill bit by the usual hoisting cable from which the drill head may be suspended.

The stack or stored drill pipe sections may be picked up automatically from their stacked positions and moved by the bottom conveyor 17 to the vertical conveyor 3 and the horizontal pipe sections on the vertical conveyor may be picked up as they reach the top of the vertical conveyor by the automatic transfer arm mechanism 15 and moved through 90° into a vertical position for operation thereon by the automatic coupling mechanism 19. Conversely, during hoisting of the pipe line, the pipe sections uncoupled by the mechanism 19 may be transferred by the mechanism 15 to the vertical conveyor and the bottom conveyor may receive the pipe sections from the vertical conveyor and move them into their stacked or stored positions within the drill base.

During coming out of the hole, i.e. during elevation of the pipe line, the drill head is disconnected from the hoisting chains and is retracted into an out-of-the-way position within the upper housing 80 at the top of the derrick frame and as the elevating chains 22 are driven, the cross yokes 27 thereon successively engage the enlargements of the upper tool joints and as the pipe line is lifted the uppermost yoke is moved automatically laterally of the pipe coupling by the automatic chain depressing rollers 61 to disconnect the yoke from the drill pipe and at that time, the pipe line is supported by a lower cross yoke engaging the following joint enlargement on the next adjacent lower pipe section, and these operations are automatically repeated so that the pipe line may be continously elevated at a rapid rate which, in this instance, for illustrative purposes, may be approximately 600 feet per minute. Each time the elevating chains 22 are depressed by the rollers 61 to release an elevator yoke from the pipe line, slack is automatically introduced into the hoisting chains by the lever operated cams 71 and after the upper yoke has been disconnected from the pipe line the depressed chains are released to permit them to move back to their normal straight paths and the slack in the chains is automatically taken up by the cams 71 as the depressing rollers move outwardly.

As the pipe line travels upwardly at a rapid rate, the automatic coupling mechanism 19 acts on the upper pipe sections to effect a tonging break-out of the upper tool joints, spinning of the upper loosened pipe sections and elevation quickly of the disconnected upper pipe sections, and as each upper pipe section is disconnected from the pipe line it is automatically grasped by the transfer mechanism 15, turned into a horizontal position and placed on the vertical conveyor 3 for lowering toward stacked position. As described above, as the pipe sections are successively disconnected from the pipe line they are moved into and stored in a stacked position within the drill base. Conversely, as the pipe line goes into the hole, i.e. during lowering of the pipe line, the drill pipe sections are moved from their stacked position within the drill base into their vertical position wherein they are received and operated on by the coupling mechanism 19 and the tool joints of the drill pipes are automatically stabbed, connected, spun, and tightened as they travel downwardly in the hole. During the coupling and uncoupling operations the parallel side chains 39 maintain the support 53 for the tonging mechanism horizontal and when the support with its tonging mechanism reaches the tops of the parallel side chains it is moved laterally away from the drill pipe and moved downwardly. When the support reaches the bottoms of the side chains it is moved inwardly to bring the tonging mechanism into position for engagement with the joint of the following section of the pipe line. Thus, the tonging mechanism engages the tool joint parts at its lower position, then moves upwardly with the pipe line and when the joint is uncoupled it moves laterally away from the drill pipe and finally it moves downwardly to a new pipe-engaging position, with the events occurring automatically in a definite sequence.

When the usual casing of the upper portion of the hole is to be effected, the well casing sections 9 may be moved into position to be lowered into the hole in a manner well known to those skilled in the art, and during this operation the casing sections may be moved by the usual dolly which travels along the dolly tracks 10 and across the casing drawbridge 11.

As a result of this invention, an improved mechanized oil field drill is provided wherein various operations are effected automatically by power operated devices thereby minimizing the manual effort usually encountered in the operation of such drilling equipment. By the provision of the improved automatic coupling mechanism operatively associated with the hoisting mechanism or elevator for the drill pipe line, the pipe sections as the pipe line is rapidly elevated may be automatically disconnected, and, conversely, during rapid lowering of the pipe line, the pipe sections may be automatically coupled together. The improved drill head which is connectible to the hoisting chains may be employed to rotate the pipe line while the hoisting chains at that time act as pulldown chains for feeding the drill bit toward the work and these hoisting chains may also be employed to elevate the drill head. By the provision of the auxiliary torque motor, the joint between the drill head and the pipe line may be either tightly connected or readily detached in an improved manner. The improved hoisting chains for raising and lowering the drill pipe line automatically engage the pipe line and as the drill pipe is elevated the hoisting chains are automatically disconnected from the upper pipe section in a novel manner, and this hoisting mechanism is so designed that the pipe line is always adequately supported as it is raised or lowered. By the provision of the mud tanks forming the base of the drill, the need for the usual wooden mats or other special supports is completely eliminated. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a drill rig, elevating and lowering mechanism for a string of drill pipe, tonging mechanism for making and breaking the joints of the pipe string as it moves in and out of the hole, and mechanism operatively associated with said elevating means and movable in synchronism therewith for raising and lowering said tonging mechanism at the same speed as the rate of pipe string travel so that the joints between the pipe sections may be broken or made during movement of the pipe string by said moving tonging mechanism.

2. A drill rig as set forth in claim 1 wherein said elevating and lowering mechanism comprises a pipe string support movable through a vertical orbital path and said mechanism operatively associated with said elevating and lowering mechanism includes a support for said tonging mechanism movable in a vertical orbital path in synchronism with said first mentioned support, and means is provided for moving said second mentioned support in synchronism with said first mentioned support.

3. A drill rig as set forth in claim 1 wherein said elevating and lowering mechanism comprises an endless hoisting chain movable in a vertical orbit and said mechanism operatively associated with said elevating and lowering mechanism includes an endless chain movable in a vertical orbit and driven in synchronism with said elevating and lowering chain, and means is provided for driving said second mentioned chain in its orbital path in synchronism with said first mentioned chain.

4. A drill rig as set forth in claim 1 wherein means is provided for disconnecting said mechanism for raising and lowering said tonging mechanism from said pipe string elevating and lowering mechanism whereby the latter may operate independently of movement of said tonging mechanism.

5. In a drill rig, hoisting mechanism for elevating and lowering a drill pipe string during running in and pulling out of a hole, horizontally disposed tonging means for engaging sections of the drill pipe string for coupling and uncoupling the joints between the pipe sections as the pipe string travels in or out of the hole, movable supporting means for said tonging means, said supporting means movable at the same speed as said elevating and lowering mechanism in synchronism with the latter, and means for moving said supporting means in synchronism with said elevating and lowering mechanism while the tonging means is maintained in operating position.

6. A drill rig as set forth in claim 5 wherein said moving means effects movement of the tonging means outwardly away from the pipe string as said supporting means approaches the upper limit of its travel and effects movement of the tonging means inwardly toward the pipe string when the said supporting means approaches its bottom limit of travel.

7. In a drill rig, an elevating and lowering mechanism for a drill pipe string composed of a series of pipe sections detachably coupled together, tonging mechanism engageable with sections of the pipe string for making and breaking the joints thereof as said pipe string moves in and out of the hole, and mechanism moving at the same speed as said pipe string during elevating and lowering thereof for raising and lowering said tonging mechanism during movement of the pipe string into and out of the hole whereby the joints of said pipe string are made or broken as said pipe string moves in the hole.

8. A drill as set forth in claim 7 wherein means is provided for effecting movement of said tonging mechanism into and out of operative engagement with the pipe sections as the pipe string is raised or lowered in the hole.

9. In a drill rig, an elevating mechanism for a sectional string of drill pipe comprising pipe sections detachably coupled by tool joints, said elevating mechanism comprising pipe engaging supports and means for moving said supports in an orbital path with said supports and spaced apart at points along the orbital path for detachably engaging the pipe sections at the tool joints, and means cooperating with said elevating mechanism for automatically releasing said supports successively from the upper pipe section of the drill string as the latter is elevated beyond said elevating mechanism into a position wherein it is adapted for reception by extraneous supporting means.

10. A drill rig as set forth in claim 9 wherein said elevating mechanism for the string of drill pipe comprises an endless hoisting chain movable in an upright orbit and by which said supports are carried at points spaced apart equidistantly along the length of said chain each from another a distance substantially equal to the length of a pipe section so that as one support is released from the pipe string another support has moved into supporting engagement with the next adjacent section of the pipe string.

11. In a drill rig, an elevating mechanism for a sectional string of drill pipe comprising spaced apart pipe-engaging supports, said elevating mechanism comprising an endless hoisting chain movable at an upright orbit and by which said supports are carried at points spaced apart equidistantly along the length of said chain, said chain as it is moved in its orbit effecting movement of said supports in an orbital path, and means for automatically releasing said supports from the upper drill pipe section as the pipe string is elevated comprising means acting on said chain for depressing the latter inwardly out of its normal path to cause the upper support to move laterally away from the upper pipe section while the pipe string is supported by a lower support on said chain.

12. A drill rig as set forth in claim 11 wherein said chain depressing means has means operatively associated therewith for automatically introducing slack in said chain as the latter is depressed inwardly as aforesaid.

13. A drill rig as set forth in claim 12 wherein said chain depressing means comprises a swingable lever arm carrying a chain engaging roller, and means for swinging said lever arm.

14. A drill rig as set forth in claim 13 wherein said means for introducing slack in said chain comprises a lever arm swingable in unison with said first mentioned lever arm and carrying a chain adjusting cam.

15. A drill rig as set forth in claim 14 wherein said elevating chain is guided at its upper portion by guiding means carried by a swingable frame and said cam as its lever arm is swung effects swinging of said swingable frame.

16. A drill rig as set forth in claim 9 wherein said pipe engaging supports are in the form of yokes and the drill pipe sections have enlarged collars provided by the tool joints and beneath which said supporting yokes engage whereby said elevating mechanism may raise or lower the drill string.

17. A drill rig as set forth in claim 10 wherein means is provided cooperating with said hoisting chain at a point on said chain near a support to be released for causing said chain to effect movement of said support laterally from supporting engagement with the upper detached pipe section.

18. A drill rig, an elevating mechanism for a drill string composed of sections joined together by threaded tool joints, said elevating mechanism comprising supports for engaging and supporting the drill string at the joints thereof, means for moving said supports in an upright orbital path with said supports spaced apart at points along the orbital path distances substantially equal to the length of the section of the drill string to be detached at the upper portion of the drill string, and means cooperating with said elevating mechanism for automatically releasing said supports successively from the upper string section to be detached as the drill string is elevated.

19. A drill rig as set forth in claim 18 wherein said elevating means including means for automatically effecting movement of a lower support in the orbital path into supporting engagement with the drill string at a point below the section of the drill string to be detached to support the drill string as an upper support is released from the drill string.

20. In a drill rig, means for raising and lowering a string of drill pipe in the hole comprising a frame, a support movable vertically relative to said frame, and elevating and lowering means on said frame and connected to said support for raising and lowering the latter, a tonging mechanism on said support and engaged with sections of the drill pipe string for relatively turning said sections to uncouple or couple a joint, means for operating said tonging mechanism as the drill pipe string is raised and lowered for uncoupling or coupling the pipe sections, and means for operating said raising and lowering means for the drill pipe string in unison with said elevating and lowering means for said tonging mechanism automatically to effect travel of the latter at the same linear speed as the drill pipe string.

21. A drill rig as set forth in claim 20 wherein said elevating and lowering means for said support comprises a pair of chains movable in unison through upright parallel orbits on said frame and to which said support is connected and means for circulating said chains in their orbits.

22. A drill rig as set forth in claim 20 wherein means is provided for operating said tonging mechanism in synchronism with said raising and lowering means for the drill pipe string whereby the pipe sections may be coupled or uncoupled automatically at a proper time during travel of the pipe string.

23. In a drill rig, means for raising and lowering a sectional drill string in a hole being drilled, the drill string comprising sections detachably coupled together by threaded joints, means for coupling and uncoupling the threaded joints between the sections of the drill string, means for moving said coupling and uncoupling means at the same raising and lowering speed as said raising and lowering means to locate said coupling and uncoupling means in coupling and uncoupling positions as the drill string travels in either of opposite directions in the hole, and means for operating said coupling and uncoupling means to effect coupling or uncoupling of the threaded joints.

24. A drill rig as set forth in claim 23 wherein said means for moving said coupling and uncoupling means is coordinated with said raising and lowering means whereby said coupling and uncoupling means operates at the same raising and lowering speed therewith for coupling and uncoupling the threaded joints of the sections of the drill string as the latter is either raised or lowered in the hole.

References Cited in the file of this patent
UNITED STATES PATENTS

| | | |
|---|---|---|
| 350,339 | Baker et al. | Oct. 5, 1886 |
| 747,236 | Schaefer | Dec. 15, 1903 |
| 1,505,007 | Cox et al. | Aug. 12, 1924 |
| 1,627,330 | Hineline | May 3, 1927 |
| 1,864,389 | Wilson | Jan. 21, 1932 |
| 1,891,832 | Parks | Dec. 20, 1932 |
| 2,133,971 | Christensen et al. | Oct. 25, 1938 |
| 2,276,016 | Brantly | Mar. 10, 1942 |
| 2,338,174 | Garrison | Jan. 4, 1944 |
| 2,450,934 | Calhoun | Oct. 12, 1948 |
| 2,477,239 | Cease | July 26, 1949 |
| 2,562,276 | Kandle | July 31, 1951 |
| 2,564,188 | Burg et al. | Aug. 14, 1951 |
| 2,578,033 | Austin et al. | Dec. 11, 1951 |
| 2,668,689 | Cormany | Feb. 9, 1954 |
| 2,678,576 | Thompson | May 18, 1954 |
| 2,781,185 | Robbins | Feb. 12, 1957 |

FOREIGN PATENTS

| | | |
|---|---|---|
| 499,955 | Canada | Feb. 16, 1954 |

OTHER REFERENCES

Stone, abstract of application Serial No. 753,591 published Feb. 5, 1952, 655 O.G. 274.